Oct. 19, 1937.  A. J. BRUNNER  2,096,422
METHOD OF AND APPARATUS FOR WORKING MATERIAL
Filed May 10, 1934
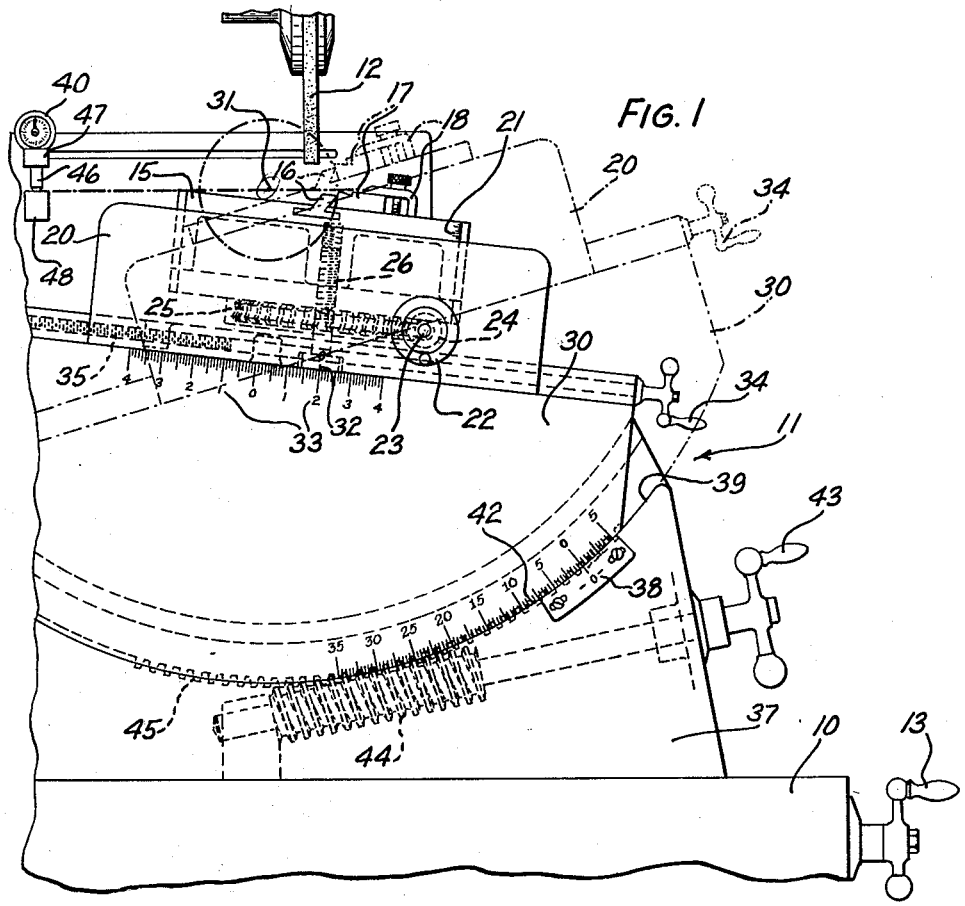
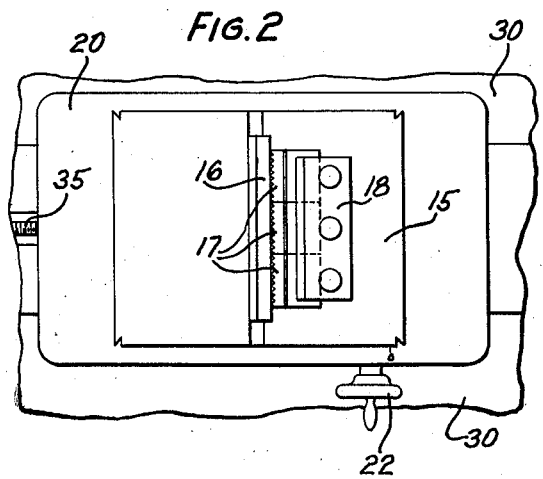
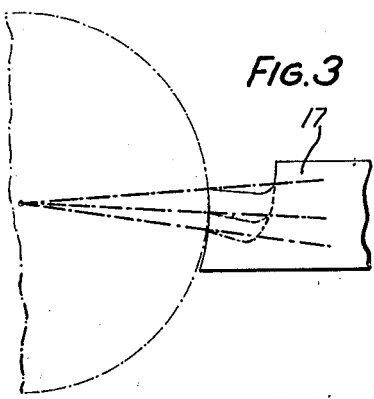
INVENTOR
A. J. BRUNNER
BY H. G. Whitehorn
ATTORNEY Patented Oct. 19, 1937

2,096,422

UNITED STATES PATENT OFFICE 2,096,422

METHOD OF AND APPARATUS FOR WORKING MATERIAL

Anton J. Brunner, Congress Park, Ill., assignor to Western Electric Company, Incorporated, New York, N. Y., a corporation of New York Application May 10, 1934, Serial No. 724,874

7 Claims. (Cl. 51—220)

This invention relates to a method of and apparatus for working material, and more particularly to a method of and apparatus for grinding thread chasers and the like.

The degrees of the cutting face angles of thread chasers vary depending upon the material upon which the thread chasers are to be used and even though the difference in the standard degrees for certain materials is slight, is is necessary that the degree of the cutting face angles be accurate to accomplish the best results.

Objects of the invention are to provide a more efficient and practical method of and apparatus for grinding cutting tools, such as thread chasers.

In accordance with the object, one embodiment of the invention contemplates the provision of a support for an article, means for clamping the article to the support, a rotatable grinding tool positioned in close proximity to the support, means for moving the support arcuately about a fixed center to position the article at a predetermined angle relative to the rotatable grinding wheel, and means for moving the support relative to the first mentioned moving means to position the article a predetermined distance relative to the fixed center for causing the grinding tool to grind the surface of the article at a predetermined angle.

Other objects and advantages will be apparent from the following detailed description, taken in conjunction with the accompanying drawing, wherein Fig. 1 is a side elevational view of the apparatus;

Fig. 2 is a fragmentary top plan view of the apparatus; and

Fig. 3 is an enlarged side elevational view of a tool illustrating a feature of the invention.

Referring now to the drawing, numeral 10 designates a table of the conventional type used in grinding machines upon which the work supporting apparatus indicated generally at 11 is mounted and arranged to be moved thereupon into any suitable position relative to a rotatable grinding tool 12 by a conventional type of moving means controlled through the actuation of a crank 13.

The apparatus 11 consists of a support 15 having a stop member 16 positioned to engage the threaded ends of one or more articles, such as thread chasers 17, which are to be ground. A clamp 18 positioned opposite to the stop member 16 will hold the articles against the stop member. The support 15 is slidably disposed in a movable element 20 in any desired manner for substantially vertical movement therein. In the present instance the movable element 20 has a slot therein conforming in general contour to the support 15, the ends of the support being connected slidably with the movable element in any suitable manner such as by a dove-tailed connection so that the upper surface or the article supporting surface of the support 15 will at all times be parallel to the upper surface of the movable element 20. An indicating scale 21 is placed along one end of the support 15 so that the support may be moved a predetermined distance relative to the movable element 20 for a purpose hereinafter described.

The mechanism for moving the support 15 consists of a handwheel 22 fixed to the outer end of a shaft 23 which extends into the movable element 20 where it is journaled. Disposed upon the shaft 23 within the movable element 20 is a worm 24 which is rotated by the shaft when the handwheel is actuated for rotating a worm gear 25. The worm gear 25 is mounted upon a threaded shaft 26, the upper portion of which is disposed in a threaded opening in the support 15 so that when the handwheel 22 is rotated clockwise causing rotation of the threaded shaft 26, the support 15 will be moved upwardly while a counterclockwise rotation of the handwheel will cause a downward movement of the support.

The movable element 20 is mounted upon a cradle 30 preferably with a tongue and groove connection so that the movable element may be moved parallel to the upper surface of the cradle to aid in properly positioning the article relative to the grinding tool. The purpose of the movable element 20 is to position the article at a desired location relative to a fixed center indicated at 31 so that the distance between the inner or cutting edge of the article and the fixed center is equal to the radius of the material which the article is adapted for. As for example, if the article is adapted to be used to thread a pipe or bar which is four inches in diameter, the movable element is moved to position the cutting edge of the article, which in the present instance is a thread chaser, so that the cutting edge or the edge adjacent to the stop 16 is positioned two inches from the fixed center 31. The fixed center 31 need not be a visible center point upon the apparatus, but is described so that the apparatus may be more clearly understood.

To accurately position the movable element upon the cradle 30 so that the article may be properly disposed relative to the fixed center 31, an indicating point 32 is placed upon the movable element 20 in alignment with the abutting edge of the stop 16 and an accurate scale 33 is placed along the adjacent or top edge of the cradle 30. A hand operated crank 34 for actuating a screw and thread connection 35 causes movement of the movable element 20 relative to the cradle 30 when the crank is rotated.

The cradle 30 is slidably mounted for rotation upon a base 37 through a tongue and groove connection, which connection is arcuate in general contour and accurately formed so that the radii of all connecting and engaging surfaces between the cradle 30 and the base 37 are from the fixed center 31.

An adjustable index 38 is disposed in the base 37 where it is held by screws but is movable along the arcuate surface 39 when the screws are loosened for a purpose hereinafter described. Along the adjacent surface of the cradle 30 is disposed a scale 42 used in cooperation with the index 38. A hand operated crank 43 mounted upon a threaded shaft 44 which interengages threads 45 of the cradle 30 provides means whereby the cradle may be moved about the fixed pivot 31.

A dial indicator 40 having a work engaging plunger 46 extending downwardly therefrom is mounted upon a bracket 47 which is slidably mounted in a frame or other suitable support so that the dial may be moved to position the work engaging plunger adjacent the cutting edge of the article. The standard gauge block 48 is positioned in the same plane with the fixed center 31 and so that the work engaging plunger 46 may be moved into engagement with the block when the indicating dial is in its position away from the article in order that the accuracy of the indicating dial may be determined before it is moved adjacent the article.

The apparatus as shown in solid lines in Fig. 1 is in the setting position, the dotted line position illustrating the grinding position into which the apparatus is moved to perform the grinding operation. The setting operation will vary according to the type of thread chaser being ground; therefore, for the purpose of illustration, let it be assumed that thread chasers for threading a four inch steel pipe or rod are to be ground. These thread chasers are placed upon the support 15 as illustrated in Figs. 1 and 2 so that the threaded portions thereof abut the stop 16 where they are held in place by the clamp 18. The thread chasers thus positioned have their cutting face angles lying in the same plane so that they may be ground during one grinding operation. The support 15 is then moved relative to the movable element 20 until the scale 21 registers half the thickness of the thread chasers 17 at which time the center lines of the thread chasers, that is, a line running longitudinally through the thread chasers and parallel with the upper and lower general surfaces thereof, will pass through the fixed center 31. This is done for the reason that in mounting the thread chasers in the threading machine the center line of each chaser passes through the center of the work. As a result of the adjustment just mentioned the center line of the chasers passes through the fixed center 31 and this relationship will be maintained throughout any subsequent adjustments made by turning cranks 34 and 43. For convenience the line of the thread chaser which passes through the center of the work being threaded will be called its axis.

The next adjustment is made by actuating the hand crank 34 to move the movable element 20 relative to the cradle 30 until the indicating point 32 on the movable element is aligned with the proper segment of the scale 33. The thread chasers being ground are positioned by this movement of the movable element 20 so that the cutting edges thereof are positioned from the fixed center 31 a distance equal to the radius of the bar or pipe which they are adapted for. These thread chasers being adapted for a pipe four inches in diameter are, therefore, positioned two inches from the fixed center by positioning the indicating point 32 in alignment with the two inch indication on the scale 33.

The grinding wheel 12 is mounted so that it may be moved vertically or horizontally to allow the adjusting operations to be performed and to finally perform the grinding operation. Mountings for grinding wheels whereby the grinding wheels may be moved vertically and horizontally with respect to the work are well known, as illustrated in the patent to W. C. F. Scramm No. 1,571,346 of February 2, 1926, and detailed description and drawings of such a mechanism for the support and movement of the grinding wheel 12 are not believed necessary. Following the setting of the movable element 20, the dial indicator 40 which is properly adjusted to register a zero reading while in engagement with the standard gauge block 48 is moved to a position where the plunger 46 will be positioned adjacent the cutting edges of the thread chaser 17, the indicating dial being movable only in a fixed path so that the work engaging end of the plunger 46 will normally be in a plane passing through the fixed center 31 and the engaging surface of the gauge block 48. The cradle 30 is then moved by the actuation of the crank 43 to move the thread chasers 17 in an arc about the fixed center 31 until the cutting edges thereof engage the work engaging plunger 46 and the indicating dial registers a zero reading. After this adjustment is made, the dial indicator 40 is returned to its position in engagement with the gauge block 48. The adjustable index 38 is then moved until it registers with the zero indication upon the scale 42. The adjustment of the index 38 is primarily necessary because the condition of the thread chaser is not always the same when it is put in the device for grinding or regrinding. If the cutting face has already been ground several times so that it lies in positions similar to those shown in dotted lines in Fig. 3, the zero adjustment will be farther to the right (in Fig. 1) than if the cutting face is as shown in full lines in Fig. 3. It will be observed that the gauging plane passing through the surface of the block 48 and the center point 31 is exactly parallel to the grinding face of the grinding wheel and that regardless of the number of times the thread chaser has been previously ground the gauging adjustment just described brings the tool to a position where the radius passing through the cutting point lies in the gauging plane and the plane of proposed cutting face is at a definite angle to the gauging plane. In order to bring the cutting face plane parallel to the grinding surface, it is necessary to turn the tool counterclockwise through the angular distance of the angle just mentioned.

The apparatus is now in readiness to be moved into the grinding position, the setting operation having been completed.

The standard cutting face angle for thread chasers adapted for threading steel rods or the like is 10°, this angle being measured from a line passing through the cutting edge of the threads and the center of the article to be threaded. Therefore, the cutting face of the thread chasers 17 should extend at an angle of 10° from a line passing through the cutting edge and the fixed center 31. The cradle 30 is, therefore, moved by the actuation of the crank 43 until a 10° indication on the scale 42 is in alignment with the index 38. This movement of the cradle 30 positions the thread chasers 17 so that the cutting faces thereof will be parallel to the line passing through the fixed center 31 and the upper surface of the gauge block 48. The grinding wheel 12 is then positioned in engagement with the cutting face of one of the thread chasers to establish its cutting position vertically, its movement to perform the grinding operation being horizontal. The cradle may be moved during the grinding operation so that the desired depth of cut made by the grinding tool may be accomplished.

As illustrated in Fig. 3 of the drawing, which shows an enlarged elevational view of the thread chaser, the additional dotted lines illustrate the depth of cuts made while reconditioning the thread chaser during a grinding operation. The purpose of this figure is to illustrate that, regardless of the depth to which the cutting face of the thread chaser has been extended, the angle of the cutting face of the thread chaser will remain the same. As stated in the foregoing, the angle of the cutting face of a thread chaser is measured from a line passing through the cutting point of the thread and the center of the work or the article upon which the thread chaser is to be used.

It will be understood that during the grinding of the thread chasers the work and the grinding wheel may be moved in a horizontal plane relative to each other, the feeding movement of the grinding wheel being from left to right as shown in Figs. 1 and 2 and another movement being back and forth transverse to the work.

In the embodiment of the invention thus far described, the grinding of thread chasers for external threading has been defined. It, therefore, should be understood that thread chasers for threading articles made of various materials and of various diameters, regardless of the cutting face angle required, may be accurately ground maintaining the required cutting face angle with this apparatus.

This apparatus is also capable of grinding thread chasers for internally threading articles constructed of various materials. The only difference in the operation of the apparatus when grinding thread chasers for external threading and when grinding thread chasers for internal threading is in the adjustment of a movable element 20. As shown in Fig. 1, the indicating scale 33 has a zero indication at the center thereof with other indications representing inches extending in both directions therefrom. The indications at the right of the zero indication are for external thread chasers, whereas the indications upon the left are for internal thread chasers. Therefore, if the thread chasers 17 are to be used for tapping an article formed of malleable iron, the diameter of the aperture to be tapped being four inches, the thread chasers are clamped to the support 15, as previously described, the support is adjusted until the scale 21 registers one-half the thickness of the thread chaser, and the movable element 20 is moved by the aid of the crank 34 until the indicating point 32 registers with the two inch indication of the scale 33 at the left of the zero indication thereof. Following the setting of the element 20, the dial indicator 40 is moved to a position adjacent the cutting edges of the thread chasers, after which the cradle 30 is moved by the actuation of the crank 43 to move the thread chasers in an arcuate path about the fixed center 31 until the cutting edges thereof engage the plunger 46 of the dial indicator and the indicator registers zero. The dial indicator 40 is then moved to its normal position adjacent the gage block 48. The adjustable index 38 is then moved until it registers with the zero indication upon the scale 42. The apparatus is now in readiness to be moved into the grinding position. If the desired angle is 10°, the cradle is rotated counter-clockwise this amount and the grinding wheel is lowered into engagement with the cutting face. The adjustment of the apparatus for grinding internal thread chasers is the same as the adjustment for grinding external thread chasers with one exception, which is the adjustment of the movable element 20 so as to position the indicating point 32 to the left of the zero indication of the scale 33 instead of to the right thereof. During the grinding, however, the cradle is rotated in a clockwise direction in the case of internal thread chasers to increase the depth of cut. In this manner the thread chasers, whether of the internal or external type, will be positioned with respect to the fixed center 31 the same as when positioned with respect to the center of an article during a thread cutting operation.

It will be understood that the nature and embodiments of the invention herein described are merely illustrative and that many changes and modifications may be made therein without departing from the spirit and scope of the invention.

What is claimed is:

1. The method of grinding a cutting tool which comprises mounting the tool for rotation about a fixed pivot with its center line disposed radially of said fixed pivot, determining a plane passing through said fixed pivot, rotating the tool until its cutting point is in said plane, then rotating the tool through a selected angular distance from said plane and grinding the cutting face of the tool in a plane which is parallel to said first plane and passes through the position occupied by the cutting point after said selected angular movement, and completing the grinding operation in said grinding plane by moving the tool about said fixed pivot during the grinding.

2. In an apparatus for grinding cutting tools and the like, a support mounted for rotation about a fixed pivot, means for mounting a tool on said support with its center line passing through said fixed pivot, means for determining a plane passing through said fixed pivot, means for rotating said support until the point of said tool is in said plane, a calibration on said support whereby the point of the tool may be brought to a grinding plane parallel to said first plane and so spaced therefrom that a line joining the cutting point in the second plane with said fixed pivot forms a predetermined angle, and a grinding wheel arranged to operate in said grinding plane.

3. The method of grinding a cutting tool which comprises mounting the tool for rotation about an axis with its cutting point spaced a predetermined distance from said axis, grinding the cutting face of the tool in a plane passing through said cutting point at a predetermined angle to a line joining said cutting point with said axis, and maintaining said grinding plane angle throughout the entire grinding operation by moving the tool about said axis during the grinding.

4. The method of grinding the cutting face of a cutting tool such as a thread chaser or the like, which comprises mounting the tool for rotation about an axis with its center line disposed radially of said axis and its cutting edge spaced from said axis a distance corresponding to the cutting radius of the tool, grinding the cutting face of the tool in a plane passing through said cutting edge at a predetermined angle to a plane joining said cutting edge with said axis, and maintaining said grinding plane angle throughout the grinding operation by moving the tool about said axis as the depth of the grinding cut is increased.

5. In an apparatus for grinding cutting tools, a rotatable support, means for mounting a cutting tool on said support with its cutting point spaced a predetermined distance from the axis of rotation of said support, means for grinding the cutting face of said tool in a plane at a predetermined angle to a line joining said axis with the cutting point, and means for rotating the support to move the cutting tool arcuately about said axis during grinding to maintain said grinding plane angle throughout the grinding operation.

6. In an apparatus for grinding a cutting tool such as a thread chaser or the like, a rotatable support, means movably mounted on said support for holding a cutting tool to be ground, means for moving said tool holding means in one direction to align the center line of said tool with the axis of rotation of said support, means for moving said holding means in another direction to space the cutting edge of the tool a predetermined distance from said axis, means for rotating the support about said axis to position the cutting edge in a plane so related with respect to said axis that it forms a predetermined angle with a line joining said cutting edge with said axis, and grinding means arranged to operate in said plane.

7. In an apparatus for grinding the cutting face of a cutting tool such as a thread chaser or the like, a rotatable support, means movably mounted on said support for holding a cutting tool to be ground, means for moving said holding means in one direction to align the center line of said tool with the axis of rotation of said support, means for moving said holding means in another direction to space the cutting edge of said tool from said axis a distance corresponding to the cutting radius of said tool, means for determining a plane passing through said axis, means for moving said support arcuately about said axis to position the cutting edge of the tool in said plane and for thereafter moving said support to position said cutting edge in a grinding plane so related to the first plane that it forms a predetermined angle with a line joining said cutting point with the axis of rotation of said support, and grinding means arranged to operate in said grinding plane.

ANTON J. BRUNNER.